United States Patent [19]

Jentet

[11] Patent Number: 4,732,718
[45] Date of Patent: Mar. 22, 1988

[54] PROCESS FOR EXTRUSION OF EXPANDABLE PLASTIC MATERIALS

[75] Inventor: Pierre Jentet, Saint-Cloud, France
[73] Assignee: Atochem, France
[21] Appl. No.: 853,634
[22] Filed: Apr. 18, 1986
[30] Foreign Application Priority Data Apr. 23, 1985 [FR] France ............... 85 06120

[51] Int. Cl.[4] .................... C08J 9/34; B29C 47/06; B29C 47/90
[52] U.S. Cl. ................... 264/45.5; 264/46.1; 264/171; 264/237; 425/325; 425/817 C
[58] Field of Search .............. 264/45.5, 45.9, 46.1, 264/237, 171; 425/325, 817 C

[56] References Cited

U.S. PATENT DOCUMENTS

| 3,764,642 | 10/1973 | Boutillier | 264/46.1 X |
| 3,879,505 | 4/1975 | Boutillier et al. | 264/45.5 X |
| 3,920,876 | 11/1975 | Albert et al. | 264/46.1 X |
| 3,922,328 | 11/1975 | Johnson | 264/46.1 |
| 4,154,785 | 5/1979 | Inui et al. | 264/45.5 |
| 4,192,839 | 3/1980 | Hayashi et al. | 264/45.5 |
| 4,548,775 | 10/1985 | Hayashi et al. | 264/45.5 |

FOREIGN PATENT DOCUMENTS

| 1498620 | 10/1967 | France |  |
| 2063589 | 7/1971 | France |  |
| 143229 | 8/1980 | German Democratic Rep. | 264/45.9 |
| 48-12061 | 4/1973 | Japan | 264/45.9 |
| 60-262621 | 12/1985 | Japan | 264/45.9 |
| 1184688 | 3/1970 | United Kingdom. |  |

Primary Examiner—Philip Anderson
Attorney, Agent, or Firm—Sigalos & Levine

[57] ABSTRACT

The process for the extrusion of an expandable plastic composition comprising extruding the composition to an at least partially expanded state through a cross section of die with an area essentially the same as that of the entrance to the cooling fixture which defines the shape and dimensions in the final profile to be produced and essentially having the shape of the latter, by leaving a space empty of material within the profile in the course of extrusion through said cross section and then confining the composition thus extruded immediately at the exit from said die cross section and essentially along the extension of the extrusion axis, within a cooled and elongated shaping space, open at both ends along said extrusion axis and having an exit cross section identical to that of the profile to be obtained, the improvement comprising separating said cooled and elongated shaping space into at least two parts separated from one another by a free space, with the first said part not exceeding a few centimeters in length and being located in direct contact with the exit from the die.

2 Claims, 1 Drawing Figure

PROCESS FOR EXTRUSION OF EXPANDABLE PLASTIC MATERIALS

BACKGROUND OF THE INVENTION

This invention pertains to the manufacture by extrusion of profiled products made of expanded plastic materials; its object is to improve accommodation and shaping of the profiles downstream of the die.

A profile with a precise contour, composed of an expanded core and an external non-expanded layer, can be continuously manufactured by passing an expandable thermoplastic through a totally or partly annular die followed by rapid stiffening of the external layer of the parison by means of a cooled fixture of the same opening area as the external opening exit of the die, placed in the immediate vicinity of the die exit and coaxial therewith; expansion of the material occurs exclusively towards the interior of the profile and fills it more or less completely. This process is described in French Pat. Nos. 1,498,620 and 2,063,589.

In practice, the gap between the die and the cooling fixture, which varies between 0 and a few millimeters, usually between 5 and 20, is adjusted by the user according to the cross section of the profile to be produced and the various expandable thermoplastic formulations, to allow for a possible slight misalignment of the cooling fixture with respect to the die while still not allowing the parison to expand outwards as it emerges from the die, which would lead at best to a deterioration in the surface state of the profile and at worst to the risk of clogging of the parison before it enters the cooling fixture, leading to breakage of the profile.

It is difficult to obtain perfect alignment between the cooling fixture and the die since the latter forms a unit with the extrusion machine, while the cooling fixture is generally attached to a support placed opposite the machine and attached to the floor on rails. In addition, under the action of forces exerted by the drawing of the profile and friction between it and the cooling fixture, the initial alignment of the fixture with the die can be changed in the course of manufacturing and lead to breakages of the profile and therefore to production stoppages which are prejudicial to the productivity of the machine.

SUMMARY OF THE INVENTION

The process which is the object of this invention, by remedying these drawbacks, facilitates the manufacture of solid or hollow profiles made of lightened plastic materials, of any cross section in terms of shape and dimensions, having a profile which is perfectly defined and constant over its entire length.

Another purpose of the process according to the invention is to improve the production of solid or hollow profiles made of lightened-core plastic materials having a dense surface resulting in the formation, either on the outer surface of said profiles or in the case of hollow profiles of the tubular type on their inner surface, of a continuous skin with a density essentially similar to that of the original non-expanded plastic material. In particular, its purpose is to facilitate manufacturing start-up for such profiles.

Another purpose is to greatly reduce or even completely eliminate the danger that the profile might break during extrusion, resulting from loss of alignment of the cooling system with respect to the die.

Another purpose is to allow better control of the ratio between expanded and non-expanded materials in the profile.

Yet another purpose is to produce, as desired, a more or less smooth profile by completely preventing or, conversely, allowing more or less pronounced eruptions of the material at the surface. A surface with no trace of expansion leads to increased impermeability, less dust retention and greater reflection of light sources, and consequently better durability for profiles exposed outdoors as well as the possibility of producing deeper colors. Conversely, a rougher surface has a satiny appearance which may appear more uniform over the entire periphery of the profile, can offer a greater resemblance to natural materials such as wood and facilitates certain subsequent surface treatments for profiles such as painting and patination.

Briefly, the present invention comprises the improvement in the process of extruding a composition of expandable plastic material in an at least partially expanded state through a cross section of die with an area essentially the same as that of the entrance to a cooling fixture which defines the shape and dimensions to be obtained in the final profile and essentially having the shape of the latter, by leaving a space empty of material within the profile in the course of extrusion through said cross section and then confining the material thus extruded immediately at the exit from said die cross section and essentially along the extension of the extrusion axis, within a cooled and elongated shaping space, open at both ends along said extrusion axis and having an exit cross section identical to that of the profile to be obtained, the improvement comprising separating the cooled and elongated shaping space into at least two parts separated from one another by a free space, with the first said part not exceeding a few centimeters in length and being attached in direct contact with the exit from the die.

DETAILED DESCRIPTION

Figure 1:
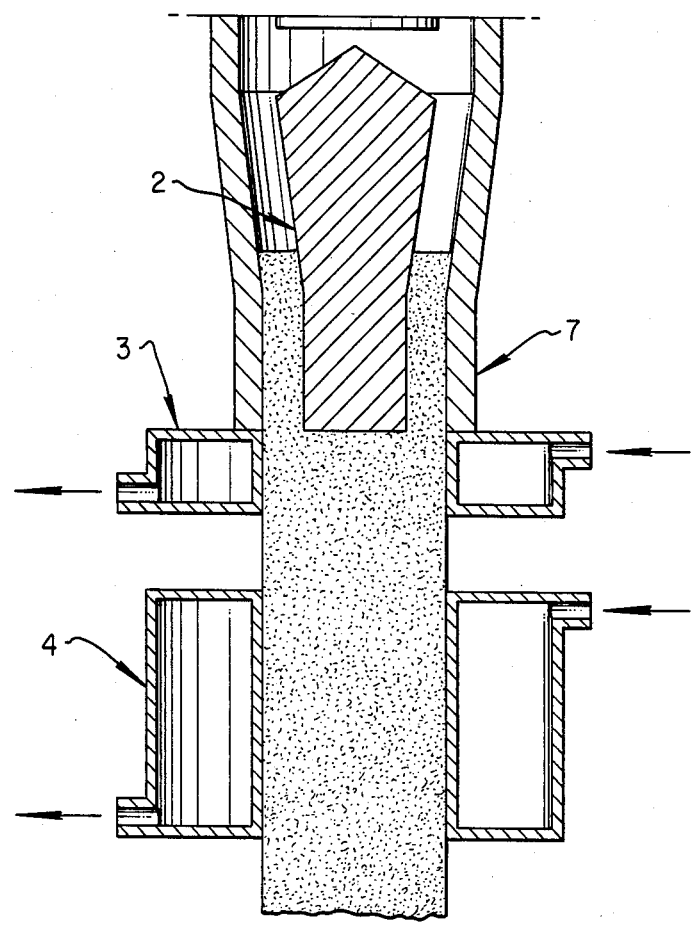

The gap between the cooling fixture spaces or fixture parts is selected on the basis of the expansion capability at constant temperature of the extruded material, its stiffening rate as the temperature decreases, the selected temperature and extrusion rate values, the cross section of the profile to be obtained, as well as the constituents of the formulation used, such as the nature of the polymer and the internal and external lubricants. In the case, for example, where extrusion is slow and expansion of the material is rapid, the contour of the profile can be defined by a rather short first part of the cooling fixture; the gap between the first and second part of the fixture can be selected rather freely depending on the surface state desired for the profile as well as the efficiency of the heat-dissipation system in this part of the cooling fixture. In the case, for example, where extrusion is rapid and filling of the cross section of the profile is slow, the gap between the first and second sections of the cooling fixture should be small, but the length of the first part might be considerable. The gap between the first two parts of the cooling fixture is usually between 2 and 10 cm.

The expression "die cross section" is understood to mean the perpendicular cross section at the exit of the die, not taking into account the existence of the empty space created within the extruded substance.

By adjusting the length of the first part of the cooling fixture, its temperature and the gap between the various parts of the fixture, it is possible to control the thickness of the non-expanded surface of the profile and/or the appearance of said surface.

In the first part of the cooling fixture and in contact with it, a thin layer of material stiffens, preventing any subsequent outward expansion. In the second part of the fixture, the thermoplastic mass expands inwards during continued stiffening of a greater or lesser thickness of material in the vicinity of the fixture wall.

The advantages of the process are the following:

(i) since there is no space separating the die from the first part of the cooling fixture, the risk that the material will jam between the die and the fixture is eliminated, (ii) since the first part of the cooling fixture is in contact with the die, alignment of the two parts is simple and remains unchanged during the entire extrusion process, and (iii) any slight loss of alignment between this first part of the cooling fixture and the subsequent parts can be accepted without the risk of breakage of the profile during formation, which is protected by the layer of stiffened material that forms in the first part of the fixture.

A device for realization of the process according to the invention comprises, referring to the FIG. 1, to die 1, attached to an extruder (not shown), in which is kept or placed a mandrel rod 2 confining to the greatest extent possible the expansion of the material and a cooling fixture in at least two parts 3 and 4. The first part 3, fit with cooling means, in direct contact with the exit from the die and essentially placed coaxially with the latter, is represented by a ring having a perpendicular cross section which at its entrance is similar to that of the die and at its exit is identical to that of the profile to be produced. It is thermoregulated so as to initiate surface stiffening of the material in contact with it, while allowing the interior to begin to fill by expansion of the material inward; it is preferably thermally insulated from the end of the die by appropriate means. The second part 4, which can in turn be divided if desired and is also equipped with cooling means, separated from the first part by a gap of between 1 and 10 cm and essentially placed on the axis of said first part, is represented by a channel of which the entrance and exit cross sections are identical to that of the profile to be produced. The flow of the cooling mixture through parts 3 and 4 is shown by the arrows.

Determination of the various parameters involved in putting the process according to the invention into practice is very simple for any person skilled in the art. In fact, once the formulation of the expandable composition of matter to be extruded has been determined, all that remains is to select, by calculation and/or by experience, the proper conditions, i.e., primarily the extrusion rate and temperature.

The expandable plastic material processed according to the invention can be of any type at all, including, for example, materials containing polystyrene, high-or low-density polyethylene, polyvinyl chloride, acrylonitrile-butadiene-styrene copolymer (ABS), polyamide, polycarbonate, or polyurethane.

The invention will be further described in connection with the following examples which are set forth for purposes of illustration only.

EXAMPLE 1

The machine used in a single-screw extruder, diameter 60 mm, screw length 1020 mm (17 times the diameter). The profile to be produced has an essentially rectangular cross section, 120 mm wide and 18 mm thick, comprising four profiled rectangular grooves, such that the cross-sectional area of the profile is 2380 mm$^2$.

To compromise between the plastication capacity of the extruder and good flatness on the non-grooved surface of the profile, a maximum rate of 70 centimeters per minute could be attained, using the following formula:

polystyrene resin: 100
polymerization agent to facilitate extrusion: 3
lubricants: 0.8
foaming agent (sodium bicarbonate): 2

The length of the first part of the cooling fixture is 25 mm, and a gap of 80 mm is present between the first and second parts of the fixture.

EXAMPLE 2

The machine used is a double-screw extruder capable of plasticating approximately 180 kg/hour of the material used. The profile to be produced has a square cross section, 50 mm on a side, comprising a concentric central cavity, also square, 20 mm on a side' the thickness of the tube is 15 mm. The sectional area is 2100 mm$^2$.

To reconcile the plastication capacity of the extruder with proper shaping of the tube angles, a configuration was used having several parts separated, after the second part, by zones of slightly reduced pressure designed to prevent the profile from collapsing, in which, in addition, water was sprayed onto the profile.

The formulation used was the following:
PVC resin: 100
polymeric agent to facilitate extrusion: 10
stabilizer: 3
lubricants: 1.3
foaming agent (azodicarbonamide): 0.7

An extrusion rate equivalent to 2.5 meters per minute could be obtained. In this case, the length of the first part of the cooling fixture is 80 mm, and a gap of 50 mm separates the first from the second part of the fixture.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. In the process for the extrusion of an expandable plastic composition comprising passing the partially expanded plastic composition through an extrusion die orifice having a cross-sectional area essentially the same as that of the entrance to the cooling fixture which defines the shape and dimensions in the final profile to be produced and essentially having the shape of the latter, by leaving a space empty of material within the profile in the course of extrusion through said cross-section and then confining the composition thus extruded immediately at the exit from said die cross-section and essentially along the extension of the extrusion axis, within a cooled and elongated shaping fixture open at both ends along said extrusion axis and having an exit cross-section identical to that of the profile to be obtained, the improvement comprising the steps of:

a. separating said cooled and elongated shaping fixture into at least two parts separated from one another by a free space, with the first said part not exceeding a few centimeters in length and being located in direct contact with the exit from the die, and b. feeding the extruded composition through said separated, cooled, and elongated shaping fixture to achieve a lightened-core plastic composition having a dense surface with a density essentially similar to that of the original non-expanded plastic composition.

2. The process of claim 1, wherein the gap between said parts of the shaping space is between about 1 and 10 cm.

* * * * *